May 10, 1927. 1,628,366
F. J. KUMMETH
POULTRY PERCH
Filed Dec. 8, 1926
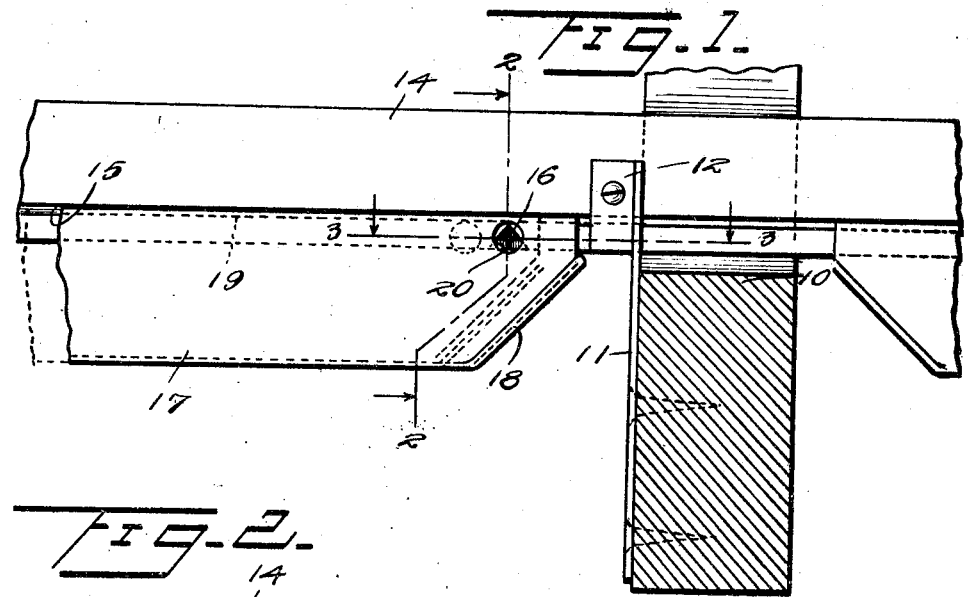
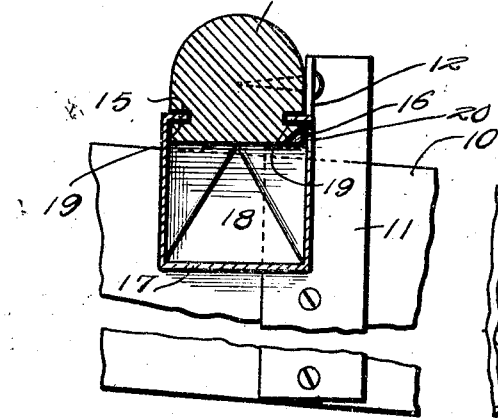
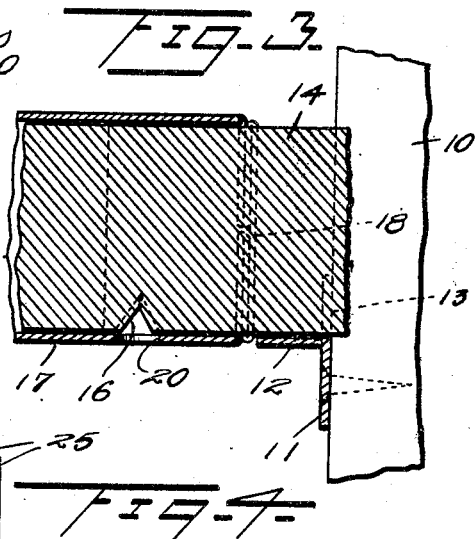
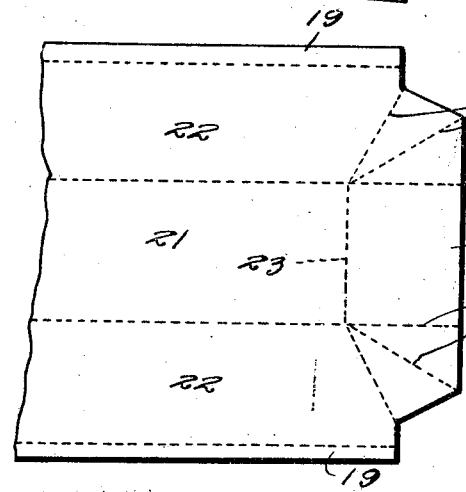
Inventor
F.J. Kummeth
By
Attorney Patented May 10, 1927.

1,628,366

UNITED STATES PATENT OFFICE.

FRANK J. KUMMETH, OF HERON LAKE, MINNESOTA.

POULTRY PERCH.

Application filed December 8, 1926. Serial No. 153,347.

This invention relates to new and useful improvements in perches, or roosts, and particularly to perches or roosts for the use of poultry.

One object of the invention is to provide a perch of this character which is adapted to contain a disinfectant, such disinfectant being so disposed as to be out of contact with the feet of the poultry.

Another object is to provide a perch of this character wherein the disinfectant is absorbed by the wooden foot contacting portion in such a manner that the upper face of the perch is only in what may be called a dry saturation, while the lower portion is in a wet saturation.

Another object is to provide a device of this character wherein the disinfectant is maintained against a too rapid evaporation, and is absorbed very slowly by the wooden portion of the perch.

A further object is to provide a receptacle for containing the disinfectant which is so connected with the wooden portion of the perch that it may be easily and quickly moved, a very slight distance, to permit a new supply of disinfectant to be poured thereinto.

A still further object is to provide a disinfectant receptacle which is simple in construction; one which has no soldered joints; and one which is adapted to be readily shipped in bundles, instead of requiring crating, whereby to preserve the receptacles, and lessen the cost of freight.

Other objects and advantages will be apparent from the following description when taken in connection with the accompanying drawing.

In the drawing:

Figure 1 is a side elevation of a portion of a poultry perch, made in accordance with the present invention, and showing the disinfectant receptacles applied thereto, and the manner of attaching the perch to a beam.

Figure 2 is a vertical transverse sectional view on the line 2—2 of Figure 1.

Figure 3 is an enlarged horizontal sectional view, on the line 3—3 of Figure 1, showing the relative positions of the filling opening of the receptacle, and the notch in the wooden portion of the perch, such opening and notch being arranged to permit filling the receptacle.

Figure 4 is a plan view of one end of the blank, from which the receptacle is formed.

Referring particularly to the accompanying drawing, 10 represents a portion of a beam of the perch frame of a poultry house, in connection with which the present invention is used. Secured to the outer vertical face of the beam 10 is a vertically extending metal plate or bracket 11, the upper end of which is provided with a laterally extending apertured tab 12, resulting in a shoulder 13, to which more particular reference will be made later herein.

The perch proper comprises a wooden pole 14, having its lower face flat, and its upper face convex, this latter portion being so shaped as to provide a comfortable grip for the feet of the poultry perching thereon. In the side faces of the pole 14, adjacent the lower edge, are the longitudinal grooves 15, and formed in the side face of the pole, below the groove, and at regularly spaced intervals, are the notches 16. The beforementioned apertured tab 12, of the bracket 11, is secured to the side face of the pole 14, at points where the pole crosses the beams of the perch supporting frame, whereby the pole is supported with only one edge of the bottom contacting with the beam. This obviates the usual flat contact between the pole and beams, which are breeding places for vermin, and which also act as receptacles for dust and dirt, with the result that such perches are very unsanitary. This is obviated by the use of the brackets 11, which hold the pole in a slightly elevated position above the beams.

The disinfectant receptacle is preferably formed of metal, and is elongated, as shown at 17. The ends of the receptacle incline upwardly and inwardly, as shown at 18. The upper longer edges of the sides of the receptacle are bent to extend inwardly, as at 19, and slidably engage in the grooves 15, of the perch pole 14. In one end of the receptacle, and in that portion directly below the groove engaging portion, there is formed a filling opening 20, which is adapted to register with the before-mentioned notch 16, to permit easy introduction of a new supply of disinfectant into the receptacle. The lower face of the perch pole 14 contacts with the upper edges of the inclined ends of the receptacle whereby to provide for a close joint, which will effectively exclude dust and dirt. The sliding connections between the sides of the receptacle and the sides of the perch pole, also provide for the proper exclusion of foreign matter, and such joints also serve to prevent a rapid evaporation of the disinfectant.

It will be particularly noted that the perch pole is provided with a plurality of receptacles spaced at such distances, along the length of the pole, that each of said receptacles may be slipped longitudinally of the pole, to bring the opening 20 opposite the notch 16, and thereby render the refilling of the receptacle easy. It will also be noted that the filling opening 20, of each of the receptacles, is arranged at such a position that the feet of the roosting fowls do not come in contact therewith, thus obviating getting the disinfectant directly on the feet. The disinfectant used in the receptacles is kerosene, and if such liquid is maintained on the feet of the poultry, soreness will result.

Upon reference to Figure 4, it will be seen that the ends of the receptacle are so folded as to produce a wall which will render the receptacle liquid-tight, and wherein there are no soldered or other joints to permit leakage of liquid from the receptacle. Furthermore, this particular form of end wall obviates breakage or damage in transportation, as the present receptacles may be shipped in bundles, without injury, while receptacles now in use must be packed in crates to prevent opening of the soldered joints. This present construction is stronger, and more durable, and by permitting shipment in bundles the cost of freight is reduced.

Upon particular reference to the blank, from which the receptacle is formed, and as illustrated in Figure 4, it will be seen that such blank comprises an elongated body portion 21, to the longer sides of which are connected the side members 22, which form, in the completed receptacle, the bottom and side walls thereof. The end portions of the body 21 are formed on the transverse fold line 23, and the portions between these ends 24, and the sides 22, are formed on the radiating lines 25, whereby to provide an end wall which is absolutely liquid-tight.

In the successful operation of the perch, the lower portion of the pole 14 becomes wetly saturated, but the liquid creeps very slowly upward, so that the upper or foot engaged portion of the pole is merely impregnated with the disinfectant, without being wet, or damp. However, such feed is sufficient to cause the required amount of fumes to arise to permeate the feathers of the poultry, and thereby kill any vermin on the poultry.

What is claimed is:

1. A poultry perch comprising a perch pole having longitudinal grooves in its sides, a receptacle disposed beneath the pole and having slidable engagement in said grooves, the receptacle having a filling opening, and the pole having an opening adapted to be registered by the filling opening upon movement of the receptacle on the pole, whereby to permit refilling of the receptacle.

2. A poultry perch comprising a perch pole having a flat lower face and longitudinal grooves in its side faces, adjacent said lower face, a receptacle for disinfectant having flanged side portions engaged in the said grooves and having the upper edges of its end walls contacting with said lower face, a notch in the pole below a groove, and the flanged portion of the receptacle having an opening adapted to register with the notch, upon sliding the receptacle.

3. The combination with a perch pole having longitudinal grooves in its side faces and a vertical notch in one of said faces above the groove thereof, of a disinfectant receptacle having inturned flanges on its side portions engaged slidably in said grooves and contacting with the bottom face of the pole, said receptacle having a filling opening in a side portion below the flange and adapted to be registered with said notch whereby to permit introduction of disinfectant into the receptacle.

In testimony whereof, I affix my signature.

FRANK J. KUMMETH.